(12) United States Patent
Marcotte

(10) Patent No.: US 11,405,287 B2
(45) Date of Patent: *Aug. 2, 2022

(54) METHODS AND SYSTEMS RELATING TO IMPACT MANAGEMENT OF INFORMATION TECHNOLOGY SYSTEMS

(71) Applicant: Troy Marcotte, Ottawa (CA)

(72) Inventor: Troy Marcotte, Ottawa (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/303,385

(22) Filed: May 27, 2021

(65) Prior Publication Data

US 2022/0014442 A1    Jan. 13, 2022

Related U.S. Application Data

(63) Continuation of application No. 15/968,587, filed on May 1, 2018, now Pat. No. 11,025,499.

(60) Provisional application No. 62/492,899, filed on May 1, 2017.

(51) Int. Cl.
| | |
|---|---|
| *H04L 41/14* | (2022.01) |
| *G06F 16/28* | (2019.01) |
| *H04L 43/0817* | (2022.01) |

(52) U.S. Cl.
CPC ............ *H04L 41/145* (2013.01); *G06F 16/28* (2019.01); *H04L 43/0817* (2013.01)

(58) Field of Classification Search
CPC ... H04L 41/145; H04L 43/0817; H04L 67/00; H04L 41/5019; G06F 16/28
USPC ....................................................... 709/223
See application file for complete search history.

(56) References Cited

U.S. PATENT DOCUMENTS

| | | | |
|---|---|---|---|
| 5,535,335 | A | 7/1996 | Cox |
| 6,694,362 | B1* | 2/2004 | Secor ...................... H04L 41/22 |
| | | | 705/28 |
| 6,779,028 | B1 | 8/2004 | Nakamura |
| 6,859,463 | B1 | 2/2005 | Mayor |
| 7,366,989 | B2 | 4/2008 | Naik |
| 7,457,864 | B2 | 11/2008 | Chambliss |
| 7,725,570 | B1 | 5/2010 | Lewis |
| 2004/0133659 | A1* | 7/2004 | Lacey ..................... G06F 9/465 |
| | | | 709/219 |
| 2004/0249927 | A1* | 12/2004 | Pezutti ................ H04L 41/5054 |
| | | | 709/223 |

(Continued)

*Primary Examiner* — Michael Won
(74) *Attorney, Agent, or Firm* — Knobbe, Martens, Olson & Bear, LLP

(57) ABSTRACT

Described are various embodiments of methods and systems relating to impact management of IT systems, including a server-based IT management system comprising a network server having a service function object store that stores a plurality of service function objects, each service function object being a digital representation of a service function and comprising one or more service attributes and one or more service function links for linking each service function object to at least one other service function object; and a network communications interface for receiving information indicative of an operating state for each service function; wherein the operability of any given service function is determined automatically upon the reduction of operating state of any one or more other service functions based on direct and indirect linkages between the given service function and the other service functions and the respective service-loss impact values associated with each said direct and indirect linkages.

20 Claims, 12 Drawing Sheets

(56) References Cited

U.S. PATENT DOCUMENTS

| | | | |
|---|---|---|---|
| 2005/0021713 A1* | 1/2005 | Dugan | H04Q 3/0029 |
| | | | 709/246 |
| 2011/0125810 A1 | 5/2011 | Van der Merwe | |
| 2012/0041858 A1 | 2/2012 | Lewis | |
| 2021/0320850 A1* | 10/2021 | Young | H04L 41/5012 |

* cited by examiner

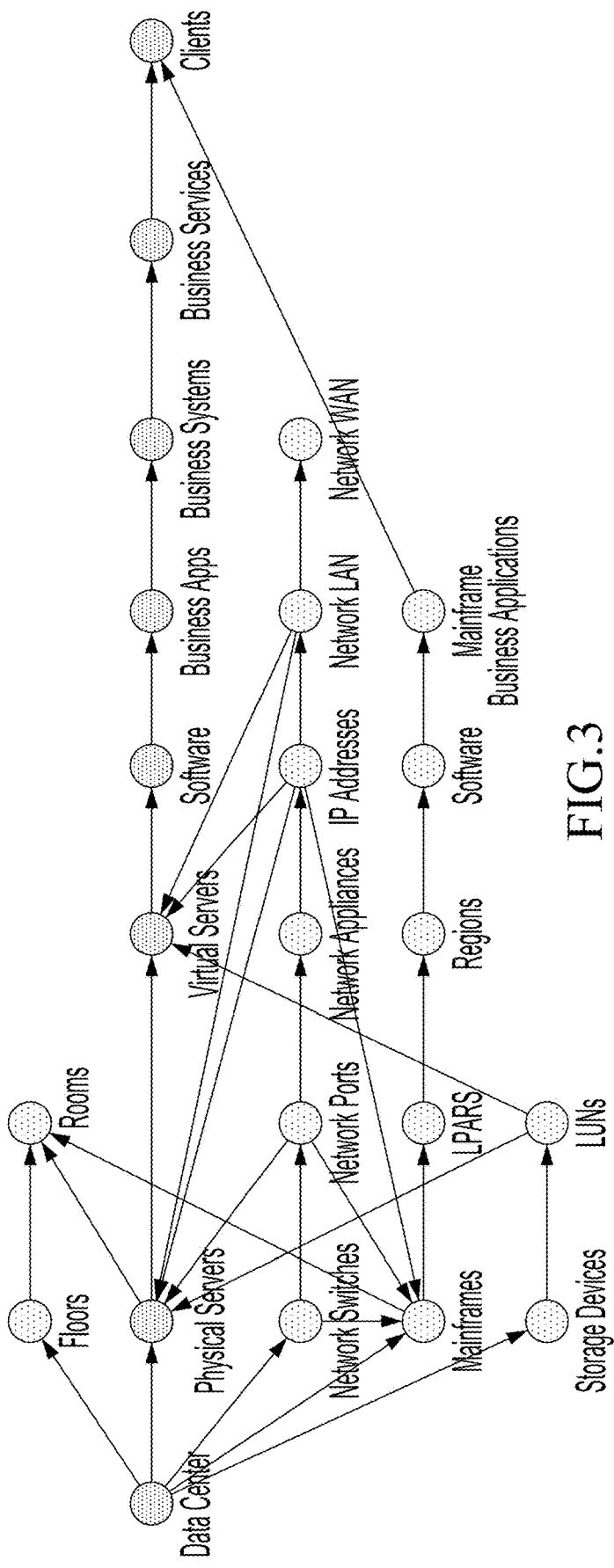

FIG.6

| Data Center 1 is Down (Offline) | | |
|---|---|---|
| Data Center to Client by Classification | Relationship Class ID (RCID) resolves to Relationship Classification and Type Below | Cross reference the (RCID) with the Relationship Object ID (ROID) | Resolves to Actual Impacted Objects |
| RCID=(C8-7) | DataCenter <Contains> Server | ROID=(O21-17) | DataCenter 1 |
| RCID=(C7-6) | Server <Runs> OperatingSystem | ROID=(O17-13) | Server 1 and 2 |
| RCID=(C5-6) | ComputerSoftware <InstalledOn> OperatingSystem | ROID=(O9-13) | Operating System 1 and 2 |
| RCID=(C4-5) | BusinessApplication <HostedBy> ComputerSoftware | ROID=(O6-9) | Software 1 and 2 |
| RCID=(C3-4) | BusinessSystem <SupportedBy> BusinessApplication | ROID=(O4-6) | Business App 1 and 2 |
| RCID=(C1-4) | BusinessService <EnabledBy> BusinessSystem | ROID=(O2-4) | Business System 1 |
| RCID=(C1-2) | Client <Uses> BusinessService | ROID=(O1-2) | Business Service 1 and Client 1 |

METHODS AND SYSTEMS RELATING TO IMPACT MANAGEMENT OF INFORMATION TECHNOLOGY SYSTEMS

CROSS-REFERENCE TO RELATED APPLICATIONS

This application is a continuation of, and claims priority to, U.S. patent application Ser. No. 15/968,587, filed May 1, 2018, which claims priority to provisional U.S. Patent App. No. 62/492,899, filed on May 1, 2017, each of which are incorporated by reference in their entirety.

FIELD OF THE DISCLOSURE

The present disclosure relates to methods and systems for assessing, reacting and managing the impact of changes in system status, and, in particular, to methods and systems for impact management of information technology systems.

BACKGROUND

Traditional computer based information systems using relational databases have inherent limitations when it comes to generating impact calculations and providing impact assessment reports. In some cases, this may relate to an inherent difficulty in one or more of the following: establishing relationships between disparate system, the effects and characteristics that may be impacted by a change in status in one or more of those systems, the extent and significance of a change of status on systems that may be directly or only indirectly associated.

Shown in FIGS. 6 and 7 there are shown, respectively, a flat file design and a relational database structure for tracking service functions in an IT system and relationships therebetween in current systems. The flat file structure 600 (e.g. spreadsheet) shown in FIG. 3 has been used to track IT systems' service functions. It has a simple design, and is easy to implement and use for highly simple data sets. Modern IT systems are highly complex, however, and this structure becomes difficult to use as it requires duplicate and repeated data elements, a bulky database design, and is mistake prone due to entering the same data multiple times. Moreover, dynamically changing IT systems, in which new service functions are added, or existing service functions change status and capabilities in real time become impossible to track using this file structure. A relational database provides for grouping information into various reusable tables 720A to 720 F with rows and columns. The tables and the data within are related through Primary and Foreign Keys 710A to 710F, which allows relationships to be created between datasets, and the output (extracting of data) is based upon queries to the various tables to collect, display or report. Such structures are common, with plenty of vendor support and mature industry best practices, and can store large amounts of data once structured. However, relational databases have a number of shortcomings in tracking IT systems: data is not stored in the same way humans see the surrounding environment; queries can get very complicated, typically involves multiple queries and multiple relationship joins to represent one object, particularly as IT systems grow in complexity over time, and status and capabilities change and evolve; the types of relationships are limited to 1:1 (one to one), 1:N (one to many) and N:M or N:N (many to many), also referred to as cardinality; N:M or N:N (many to many) relationships have to be joined through a junction/mapping table adding to the complexity and increasing the number of tables in the database. In general, the model design is a rigid design, tables have to be designed correctly beforehand and they are difficult to design "on the fly" as IT systems change and grow.

There is a need for systems and methods that extract the data from such relational database tables into an object model layer and run impact-related calculations on the objects rather than the table structures directly.

This background information is provided to reveal information believed by the applicant to be of possible relevance. No admission is necessarily intended, nor should be construed, that any of the preceding information constitutes prior art or forms part of the general common knowledge in the relevant art.

SUMMARY

The following presents a simplified summary of the general inventive concept(s) described herein to provide a basic understanding of some aspects of the disclosure. This summary is not an extensive overview of the disclosure. It is not intended to restrict key or critical elements of embodiments of the disclosure or to delineate their scope beyond that which is explicitly or implicitly described by the following description and claims.

The Impact Management System (IMS) is a computer system component that can stand-alone or be incorporated into existing computer systems. The Impact Management System (IMS) utilizes an Intelligent Object Model (IOM), containing Intelligent Path Routing (IPR) and Intelligent Path Routing Algorithms (IPR-A) capabilities based upon scientific and mathematical inputs necessary for to accurately perform impact calculations necessary for impact assessment reporting.

Embodiments described herein are configured to extract and use data typically located in relational tables into an object model layer, and then and run calculations on the objects rather than the table structures directly. The Intelligent Object Model (IOM) allows for the creation of this abstraction resulting in capabilities and efficiencies beyond the inherent limitations of relational tables when traversing related objects.

A need exists for methods and systems for impact management of information technology systems that overcome some of the drawbacks of known techniques, or at least, provides a useful alternative thereto. Some aspects of this disclosure provide examples of such methods and systems.

In accordance with one aspect, there is provided a server-based IT management system comprising a network server further comprising a service function object store that stores a plurality of service function objects, each service function object being a digital representation of a service function and comprising one or more service attributes and one or more service function links for linking each service function object to at least one other service function object; and a network communications interface for receiving information indicative of an operating state for each service function; wherein each service function link is associated with a service-loss impact value indicating service-loss impact on the operating state of each linked service function linked thereto upon a reduction in operating state of the service function; and wherein the operability of any given service function is determined automatically upon the reduction of operating state of any one or more other service functions based on direct and indirect linkages between the given service function and the other service functions and the respective service-loss impact values associated with each said direct and indirect linkages.

In accordance with another aspect, there is provided a server-based IT management method, said method implemented on a server-based IT management system comprising a network server and a network communications interface, said method comprising: storing a service function object store in said network server, a plurality of service function objects, each service function object being a digital representation of a service function, each service function object comprising one or more service attributes; associating one or more service function links between at least one of the service function objects, wherein each service function link is associated with a service-loss impact value indicating service-loss impact on the operating state of each linked service function linked thereto upon a reduction in operating state of the service function; receiving information indicative of an operating state for each service function via said network communications interface; and automatically determining, upon the reduction of an operating state of any one or more other service functions, the operability of any given service function based on direct and indirect linkages between the given service function and the other service functions and the respective service-loss impact values associated with each said direct and indirect linkages Other aspects, features and/or advantages will become more apparent upon reading of the following non-restrictive description of specific embodiments thereof, given by way of example only with reference to the accompanying drawings.

BRIEF DESCRIPTION OF THE FIGURES

Several embodiments of the present disclosure will be provided, by way of examples only, with reference to the appended drawings, wherein:

FIG. 3 is a diagram of the business intelligence management system architecture and connections to various exemplary trusted sources of data.

FIG. 4 is an exemplary intelligent path routing report using 3 impact assessment examples.

Figure 6:
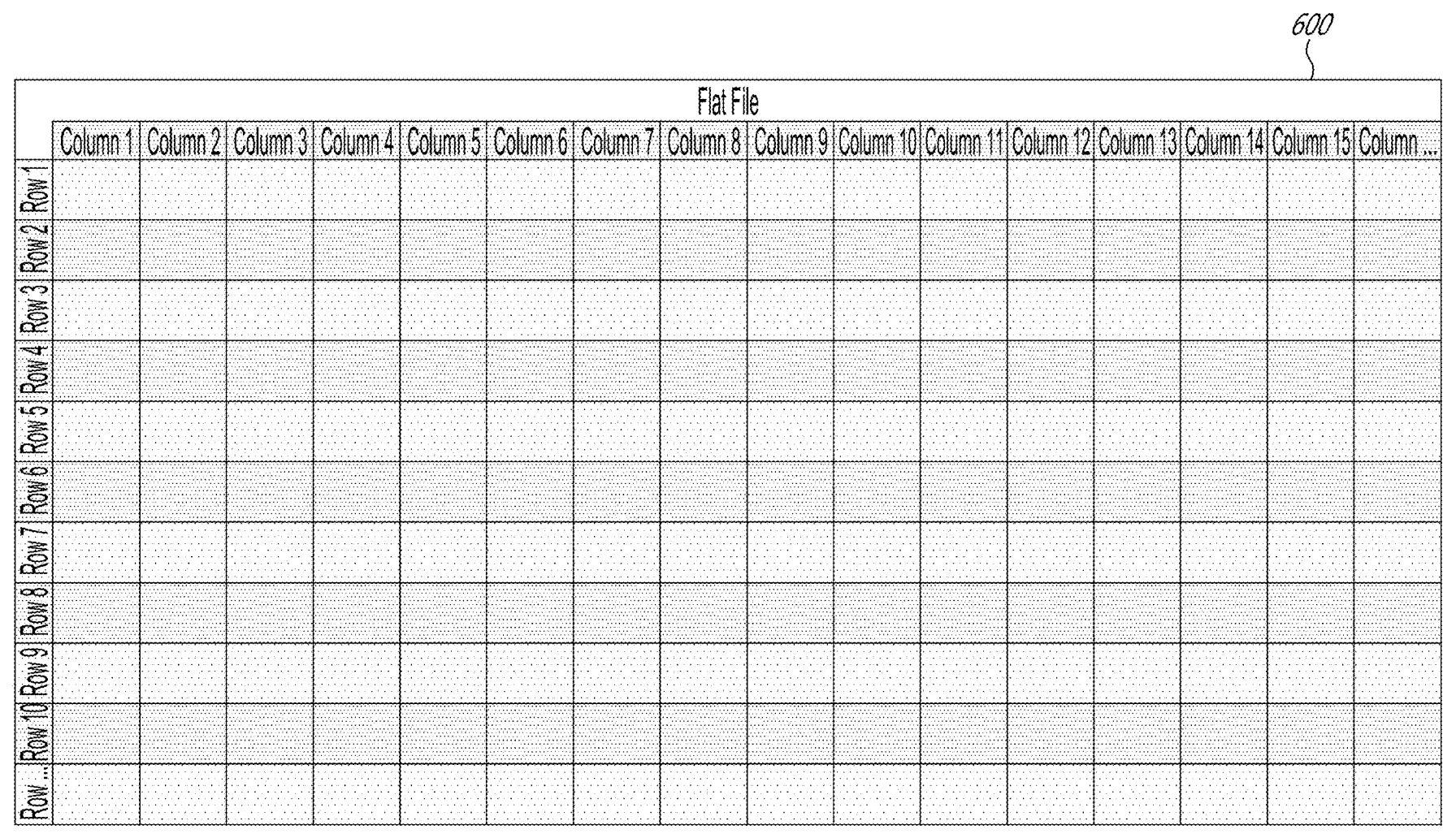

FIG. 6 shows an example of a flat file design structure for tracking service functions in an IT system and relationships therebetween in current systems.

FIG. 11 shows in table form a critical path determination in accordance with an embodiment hereof.

Figure 1:
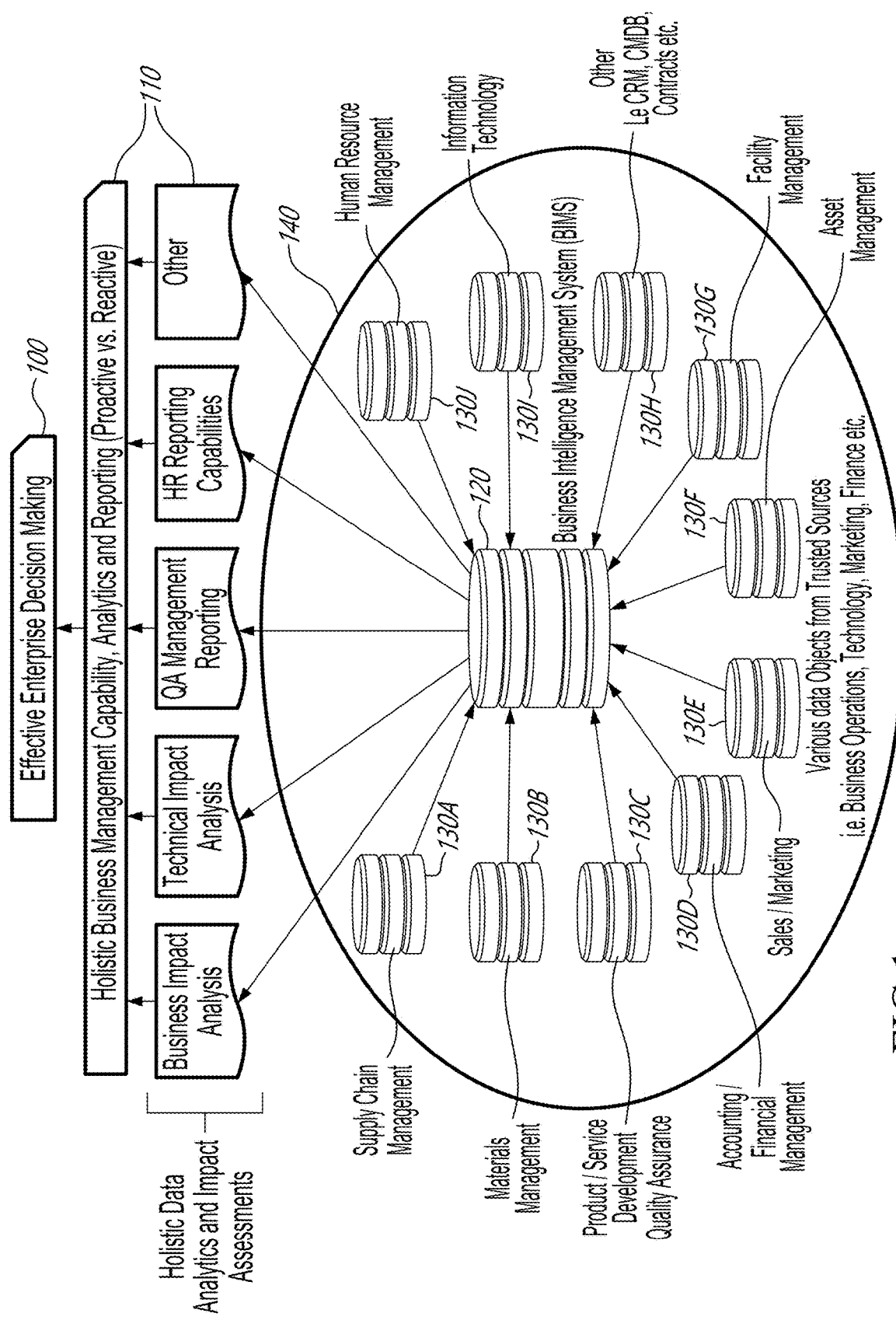
FIG. 1 is an exemplary illustration of the relationships between an IT system architecture and the layered groupings of the intelligent path object model.

Elements in the several figures are illustrated for simplicity and clarity and have not necessarily been drawn to scale. For example, the dimensions of some of the elements in the figures may be emphasized relative to other elements for facilitating understanding of the various presently disclosed embodiments. Also, common, but well-understood elements that are useful or necessary in commercially feasible embodiments are often not depicted in order to facilitate a less obstructed view of these various embodiments of the present disclosure.

DETAILED DESCRIPTION

Various implementations and aspects of the specification will be described with reference to details discussed below. The following description and drawings are illustrative of the specification and are not to be construed as limiting the specification. Numerous specific details are described to provide a thorough understanding of various implementations of the present specification. However, in certain instances, well-known or conventional details are not described in order to provide a concise discussion of implementations of the present specification.

Various apparatuses and processes will be described below to provide examples of implementations of the system disclosed herein. No implementation described below limits any claimed implementation and any claimed implementations may cover processes or apparatuses that differ from those described below. The claimed implementations are not limited to apparatuses or processes having all of the features of any one apparatus or process described below or to features common to multiple or all of the apparatuses or processes described below. It is possible that an apparatus or process described below is not an implementation of any claimed subject matter.

Furthermore, numerous specific details are set forth in order to provide a thorough understanding of the implementations described herein. However, it will be understood by those skilled in the relevant arts that the implementations described herein may be practiced without these specific details. In other instances, well-known methods, procedures and components have not been described in detail so as not to obscure the implementations described herein.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" may be construed as X only, Y only, Z only, or any combination of two or more items X, Y, and Z (e.g., XYZ, XY, YZ, ZZ, and the like). Similar logic may be applied for two or more items in any occurrence of "at least one . . . " and "one or more . . . " language.

Figure 8:
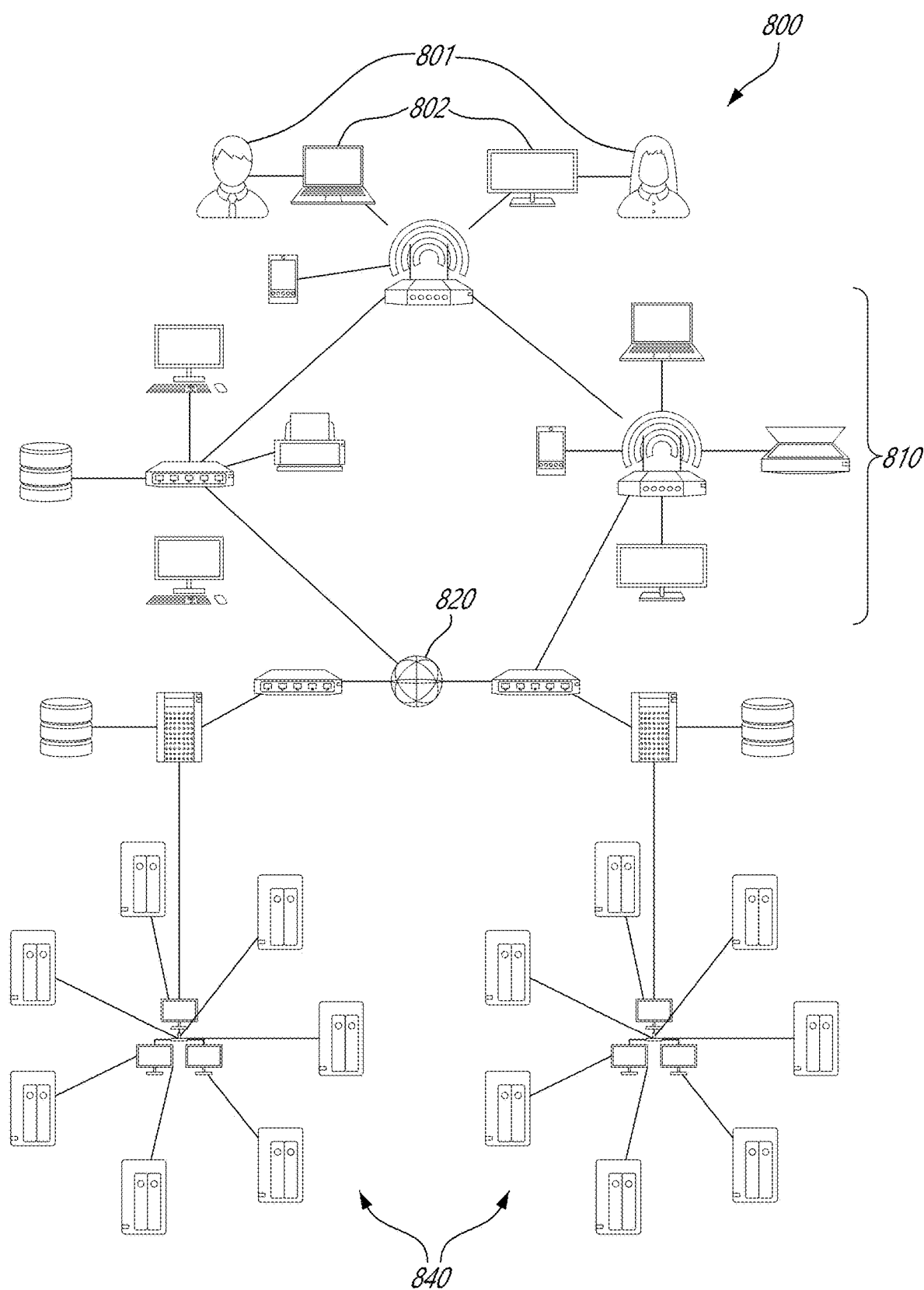
FIG. 8 shows an exemplary conceptual diagram of the service functions associated with a typical IT system, arranged in accordance with an object model.

Referring to FIG. 8, there is shown an exemplary conceptual diagram of the service functions associated with a typical IT system, arranged in accordance with an object model. This object model offers some advantages over flat file and relational databases; for example, being object based, data is designed representing how humans generally view the system and objects have attributes (properties) and relationships to other objects that are generally intuitive (e.g. it can represent users 801 and user client devices 802, any and/or all elements in a local network 810, clear connectivity to the Internet 820, and all elements of associated data centers 840), all relationships can be N:M (many to many) and new tables or constructs are not required as the system grows and changes as would be required with relational database models, it provides a flexible design that can extend the object model schema as required easier than a relational data model making it easier to add data by adding a new object into the existing model instead of adding tables that may be different from an existing schema, and provides for searching for related objects using a process called transversals. Object models, however, have some disadvantages; namely that transversals, which allow users to see all the related objects, requires building all criteria into related queries, and that result sets are generally one level deep or follow paths until no more paths exist to related objects making the data set large as it displays everything that is connected to everything.

Figure 9:
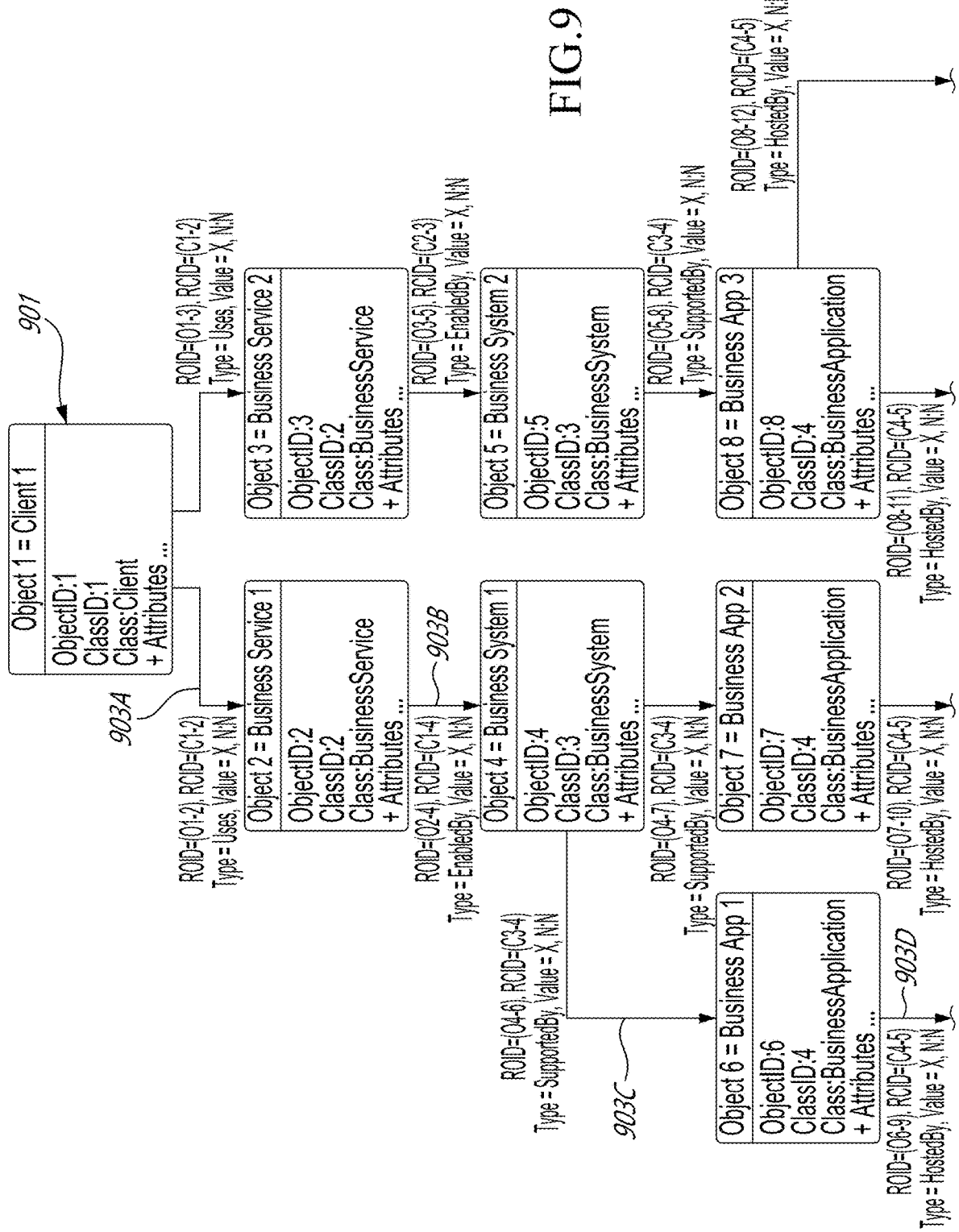
FIG. 9 shows an exemplary conceptual diagram of the service functions objects associated with a typical IT system, arranged in accordance with an intelligent object model in accordance with one embodiment hereof.
Figure 9:
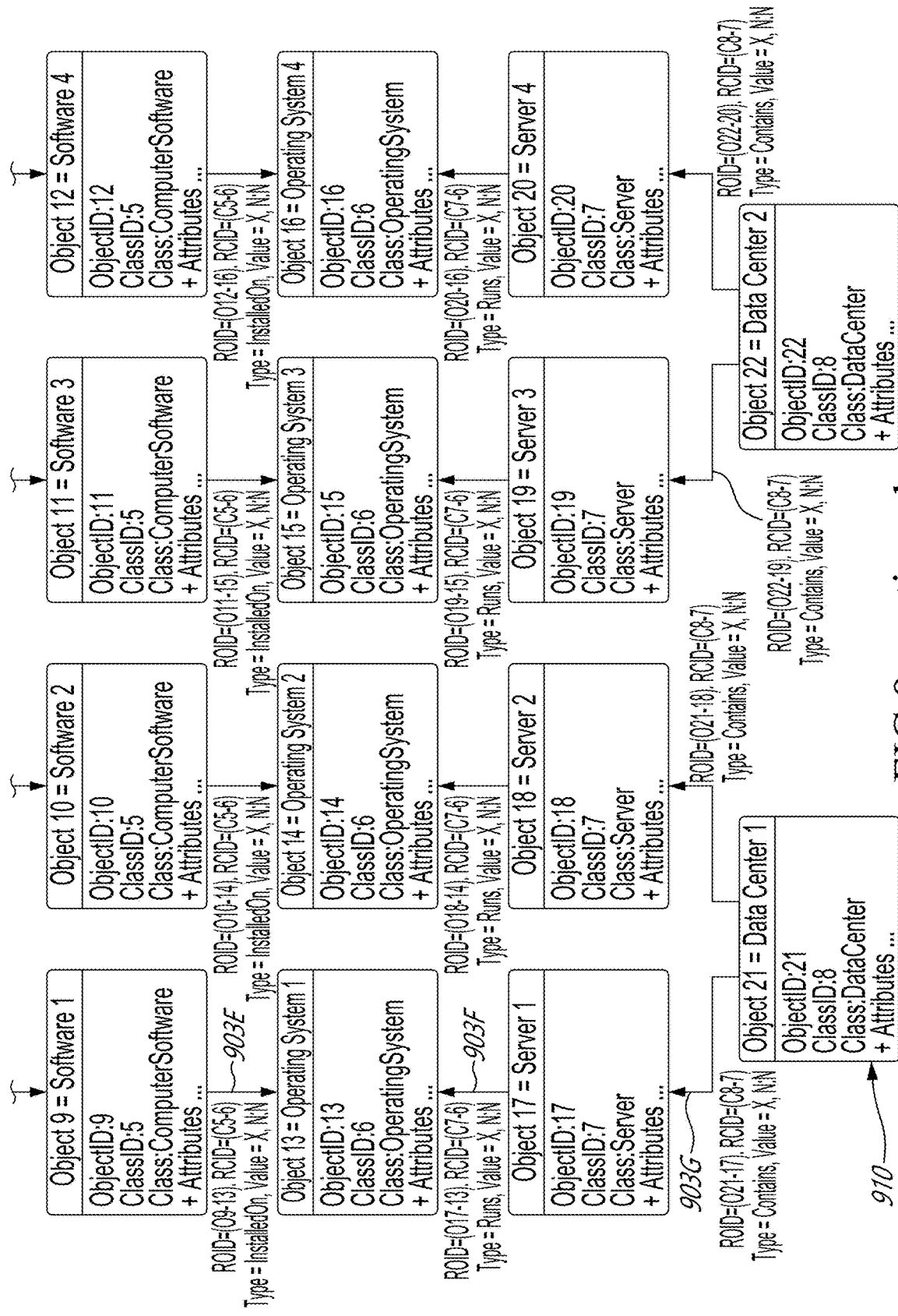

Referring to FIG. 9, showing an exemplary representation of an intelligent object model. It shows service function objects, including a client service function 901 and its relationships linking 903A to 903G to a data center service function 910. Embodiments of the intelligent object model may have some added complexity over a typical object model, partly because in some cases it comprises service function links with attributes. Relationship attributes, shown in association with each of the relationships (including those on a linkage 903A to 903G from the client service function 901 to a data center service function 910), enable an Impact Analysis through directly related Objects and by Inference. In the embodiment shown, each service function link comprises the following exemplary information: ROID and RCID (object and connection description and status), Type (description of relationship type), Value (a value associated with the relationship), and Cardinality (e.g. 1:1, 1:N, N:M). Other attributes can be used, and additional types of relationship attributes may be added dynamically. Attribute values for any given relationships may be amended independently of other relationships and service function objects. Relationship attributes enable Object Class rules that can be used to perform an Impact from any predefined Object (Starting Point) and Object End Point Relationship attributes enables the computational calculations using the Value attribute pair to determine Criticality, Redundancy, or any weighted/percentage to calculate proactive impact of any one or more service functions, particularly with respect to a critical set of one or more service functions or the critical path associated with links between two or more service functions. Intelligent Object Model Containing Relationship attribute variables to calculate computational impact of a reduction in operational status of any given service function (or group thereof) on any other given service functions (or group thereof).

The systems and methods described herein provide, in accordance with different embodiments, different examples, including the Business Intelligence Management System (BIMS), which address shortcomings in the state of the art through the use of an Intelligent Object Model (IOM) that is flexible, and capable of bringing together relevant data from various trusted sources into a cohesive format and addressing the disparate data schema problem. Intelligent Path Routing (IPR) can be implemented to enhance the Intelligent Object Model (IOM) by extending reporting capabilities on objects that are related only through inference. The Intelligent Object Model (IOM) and Intelligent Path Routing (IPR) together significantly enhance data analytics and impact assessment reporting capabilities in the Business Intelligence Management System (BIMS).

The Business Intelligence Management System (BIMS) is designed to efficiently structure relevant business data together into objects, attributes and object relationships into a cohesive object model. The Intelligent Object Model (IOM) can layer on top of existing data models (relational or otherwise) or can be incorporated with other existing object model designs; the term as used herein refers to a generalized description of the instantiation of service function objects that represent service functions, and the relationships therebetween. The Business Intelligence Management System (BIMS) can be a stand-alone system or deployed into any heterogeneous environment to increase operational efficiencies, significantly increase holistic data analytics capabilities and enterprise impact assessment reporting. This design allow business to make the critical decisions and realize impacts to the organizations without the need to replace the current tools, databases or information systems.

Embodiments hereof may include an Intelligent Object Model (IOM) which is an object and information model design used by the Business Intelligence Management System (BIMS); in embodiments, objects used by the BIMS and referred to herein refer to service function objects that are instantiated objects representing service functions associated with an IT system in respect of which the BIMS is operative. Such a model, or other similar configurations disclosed hereby, may contain object information including but not limited to object classifications, object attributes, and relationship to other objects and their instances. The relationships, referred to as links, or service function links, can be unidirectional, bidirectional, direct, or inferred through multiple hops along an intelligent path of objects that represent the actual or logical environment within the data. A linkage between a first service function (or group of service functions) and a second service function (or group thereof) may be referred to as linkage or a path; embodiments hereof may be directed towards identifying linkage between any first service function (or group thereof) and second service function (or group thereof) and categorizing or understanding such linkages or path. Some embodiments may be directed towards understanding the impact of a reduction in operation of a first service function (or group of service functions) on a second service function (or group thereof) that are linked by one or more links on the same path or linkage. These service function links are stored in the BIMS in association with service function objects and represent the direct links therebetween, and may comprise of or access information relating to said links, including the linked service function object, and the service-loss impact values or other values. In some embodiments, a service-loss impact value indicates the level of operational impact on the service function from a reduction in operation another service function to which the service function is linked by the corresponding service function link.

Embodiments hereof include a server-based IT management system comprising a network server in which the BIMS is run or from which the BIMS is executed. The BIMS may instantiate a service function object store that stores a plurality of service function objects, each service function object being a digital representation of a service function. A service function may be any component, device, service, output, or group thereof that forms a part of, or is controlled, managed, or monitored by, the IT system associated with the BIMS. For example, referring to FIG. 1, IT components 130A to 130J, as well as subcomponents thereof and any services, devices, outputs (or group thereof) may be instantiated as service function objects within the BIMS. Additional service object functions may be created at any time thereafter (e.g. as a new class that represents an aspect of an existing or new service function) and instantiated after that. Each service function objection may comprise of one or more service attributes that can be used to describe characteristics of a given service function object, particularly as such characteristics change over time. The network service, in general, comprises of a network communications interface, which is used, among other things, to receive real-time information relating to the characteristics, including operational characteristics and status, of the service function corresponding to the service function object.

In some embodiments, each given service function objection may be amended at any time by, for example, adding, deleting, or changing service attributes of a given service object function. In embodiments, service function objects can be managed by the BIMS without changing any relationship between the service functions themselves, or the underlying service function-specific data associated therewith. For example, databases or data storage devices may be associated with a given service function (in this example, a service function could be, among other things, an OS on which an application is running, an application, a disk on which data used by the application is running, or a network device sending and receiving information used by the application). The relationships between these service functions may be changed over time as new disks are added, the network is expanded to accommodate additional traffic, or the application is upgraded or changed to provide other functionality. The system can still be managed simply by amending the object model, not the underlying relationship between the service functions themselves, or the data provided by the service functions themselves. In some prior art systems, relational databases were used to manage these relationships, however, the creation of links between tables, or entries therein—and managing changes to the tables— became incredibly cumbersome as systems become more complex. A query to establish, for example, the status of linked service functions using links in related tables was static with respect to the tables and the links therebetween; for every new service function added, or new relationship between service functions added, there arose difficult problems associated with generating new and often complex table relationships and new complex queries associated with each new addition.

In some embodiments, each service function object may further comprise one or more service function links for linking each service function object to at least one other service function object. Such a service function link is used to describe a connection or association with each such service function object link from other service function objects (or indeed, in some embodiments, other inputs, components, or services for which the BIMS has not instantiated any service function objects). In some aspects, the one or more service function links associated with a given service function comprises information that describes the other service functions with which each such service function is linked and, in some embodiments, the nature of that link. For example, it may describe a dependency in respect of the other service function; in some cases, the linked service function is dependent on the service function corresponding to the stored service function link, or vice versa, or sometime there may be interdependence.

In embodiments, service function links may also comprise of a service-loss impact value indicating service-loss impact on the operating state of each linked service function linked thereto upon a reduction in operating state of the service function. In aspects, this provides an indication of the impact on operability or functionality of the applicable service function (i.e. the service function corresponding to the service function object in association with which the service function link is stored). This may comprise a more binary indication: functional or non-functional, or it may comprise a more graded indication. In some cases, the impact on operability is a function of one or more factors; said function, in some cases, may be dependent on characteristics of linked or indirectly linked service functions.

In some embodiments, the network server on which the BIMS is executed further comprises a network communications interface for receiving information regarding each service function for which there is a corresponding service function object instantiated on said network server (or some cases, on another communicatively linked computing device). The network communications interface may comprise point-to-point links such as Serial Advanced Technology Attachment (SATA) or a bus type connection such as Parallel Advanced Technology Attachment (PATA) or Small Computer System Interface (SCSI), a daisy chained topology such as IEEE-1394, a link supporting various topologies such as Fibre Channel, or any other computer communication protocol, standard or proprietary, that may be used for communication to computer readable medium. The memory/bus controller may also provide other I/O communication links. In some embodiments, the network communications interface may be a shared bus architecture such as peripheral component interface (PCI), microchannel, industry standard architecture (ISA) bus, extended industry standard architecture (EISA) bus, VERSAmoduleEurocard (VME) bus, or any other shared computer bus. In other embodiments, the network communications interface may be a point-to-point link such as PCI-Express, HyperTransport, or any other point-to-point I/O link. Various I/O devices may be configured as a part of the network server system. In many embodiments, a network communications interface may be included to allow the network server to connect to a network. A network, such as the Internet, a LAN, WAN, or other network, may operate in accordance with standards for an IEEE 802.3 ethernet network, an IEEE 802.11 Wi-Fi wireless network, or any other type of computer network including, but not limited to, LANs, WAN, personal area networks (PAN), wired networks, radio frequency networks, powerline networks, and optical networks. A network gateway or router, which may be a separate component from the network server or may be included as an integral part of the network server, may be connected to communicatively connected communications networks to allow the applicable system to communicate with the Internet (or other network) over an internet connection such as an asymmetric digital subscriber line (ADSL), data over cable service interface specification (DOCSIS) link, T1 or other internet connection mechanism. In other embodiments, the network server may have a direct connection to the Internet (or other network). The network server may be connected to one or more other computers such as a desktop computer or laptop computer via the Internet, an intranet, and/or a wireless node. In some embodiments, an expansion slot may be included to allow a user to add additional functionality to the network server.

In some embodiments, the network server is configured to determine an operability of any given service function is automatically upon the reduction of operating state of any one or more other service functions based on direct and indirect linkages between the given service function and the other service functions and the respective service-loss impact values associated with each said direct and indirect linkages. In some embodiments, a reduction in operating state is not required, as the network server may determine what the impact on operability of a given service function prior to any reduction in operating state. This may be useful for planning or management purposes so that, for example, critical service functions can be determined and whether or not such critical service functions can be supplemented with redundant service functions; or, more generally, the operational impact on any service function (or group of service functions) upon the reduction of operability on any other one or more service functions within the IT system. In some embodiments, the operability of any given service function, is calculated based on one or more of the service-loss impact values associated with each service function link associated with a service function object corresponding to any service function that is directly or indirectly linked therewith. An example of an indirectly linked service functions would include two service functions that are linked via one or more other service functions.

Embodiments hereof may include Intelligent Path Routing (IPR), which in some embodiments is a feature of the Intelligent Object Model (IOM) or other similar models or designs supported hereby. It provides for the determination of impact assessments across directly related objects or extend the capability to allow impact to be determined across objects that are indirectly related or inferred. In some embodiments, IPR may refer to methods and systems disclosed herein whereby linkages are determined between a first service function (or group of service functions), a second service function (or group thereof), and any other service functions (or groups of service functions) that are linked (directly or indirectly) with said first and second service functions (or groups thereof), as well as the operational impact on any service function (or groups thereof) directly or indirectly linked to said linkage upon a reduction in operational state of any other service function (or group thereof) that is linked directly or indirectly to said linkage. An example of an indirectly linked service functions would include service functions that are connected via another service function, whereas an example of directly linked service functions would include those that have a dependency directly therebetween.

Prior Information Technology systems may comprise one or more significant gaps in way enterprise data is partitioned, or structured differently in vendor based information systems. To complicate matters the reporting capabilities are mainly concerned with writing queries against relational database tables, where the objects are less obvious thereby omitting the information object model layer where the Intelligent Object Model (IOM) exists and where the Intelligent Path Routing (IPR) capabilities are realized.

There are inherent limitations in traditional tools and segregated information systems that only track fractional information and not the holistic scope. Further limitations are evident when using traditional relational databases queries for reporting on data objects that are not directly related to each other. These relationships are more efficiently defined in informational objects whereby inference is the norm and reflects the actual operational and technical environments. Intelligent Path Routing (IPR) leverages these object paths where traditional systems do not have a mechanism to transcend critical paths of inferred objects with any predetermined intelligence or accuracy. The reporting complexity increases as scenarios as based upon relationships outside of the direct variety and only becomes even more complex when dealing with inferred, directional, bidirectional, linear and across multiple hops and multiple paths.

The Business Intelligence Management System (BIMS) along with the added feature of Intelligent Path Routing (IPR) allows the addition of intelligence into the path of objects for a given business or technical scenario or potential impact.

These indirect or inferred relationships cannot be viewed or reported upon in an efficient way until intelligent paths are incorporated. Traditional databases use limited filters based upon object classifications, and relationship types, but have difficulty when stringing object classes together across predetermined paths to execute impact analysis. Because there is no mechanism to easily add the intelligence other than building separate queries for each scenario, therefore making it inefficient, costly and time consuming. In some cases, information systems try to incorporate the intelligence into the way the data model is designed or by how the data is entered. The first option does not allow for flexibility and it too rigid to be considered intelligent. Secondly, relying on how the data is entered is prone to errors and inconsistencies. Most often the scenarios are not incorporated into the data structure, queries have to be run and then strung together and may total in the hundreds or thousands to give the desired capability, and are subject to change. IPR allows for the paths to have pre-designed intelligence whereby the paths follow real world scenarios and once defined can be used in many different times over and over to solve complex problems of inference in the data once the intelligence has been programmed.

This intelligent path can be predetermined to represent an environment, a system, a process, a physical entity, a logical entity, a virtual entity or any mix thereof. Any system that can be described, and deemed within scope by virtue of impact, can be modeled using the Intelligent Object Model (IOM) and further defined with attributes and relationships.

The impact assessment is determined from transcending and gathering data elements from related objects, upstream or downstream any given path. These paths can transcend over any number of hops (strings of connected objects) via direct paths or paths of inference. It can also handle singular or multiple paths based upon a given scenario or complex problem whereby there are object entry points (start points) and desired exit points (end points). This is available through the Intelligent Object Model (IOM) and not efficiently possible in traditional relational databases. With the Business Intelligence Management System (BIMS) detailed environmental, business and technical scenarios that impact a business can be determined and pre-programed into intelligent paths. These paths and the data analytics determine, in real time, the impacts these objects have to the business via direct or inferred components. Weighted values can be added to the objects to automatically calculate the severity, impact and priority of business impact for a given scenario.

In embodiments, the server-based IT management system comprises digital data storage for storing digital data representing service functions; such digital data may be stored in one or more data repositories in network communication with the network server. In some cases, the data repositories store data relating to the BIMS and/or the IPR distinctly from the service functions themselves. The digital data storage may include one or more random access memory (RAM) devices such as synchronous dynamic random-access memories (SDRAM), double data rate (DDR) memories, or other volatile random-access memories. It may also include non-volatile memories such as electrically erasable/programmable read-only memory (EEPROM), NAND flash memory, NOR flash memory, programmable read-only memory (PROM), read-only memory (ROM), battery backed-up RAM, or other non-volatile memories. In some embodiments, the network server may also include 3rd level cache memory or a combination of these or other like types of circuitry configured to store information in a retrievable format. In some implementations, data storage may be configured as part of the network server, or alternatively, may be configured separate from it but within the same package. The network server may be able to access internal memory via a different bus or control lines than is used to access the other components of the network server (or computing system) on which the BIMS is implemented. The network server may also include, or have access to, one or more hard drives (or other types of storage memory) and optical disk drives. Hard drives and the optical disks for optical disk drives are examples of machine readable (also called computer readable) media suitable for storing the final or interim results of the various embodiments. The optical disk drives may include a combination of several disc drives of various formats that can read from and/or write to removable storage media (e.g., CD-R, CD-RW, DVD, DVD-R, DVD-W, DVD-RW, HD-DVD, Blu-Ray, and the like). Other forms or computer readable media that may be included in some embodiments of a network server include, but are not limited to, floppy disk drives, 9-track tape drives, tape cartridge drives, solid-state drives, cassette tape recorders, paper tape readers, bubble memory devices, magnetic strip readers, punch card readers or any other type or computer useable or machine-readable storage medium. Data storage may store the data repository in a relational database, or other database structures.

The network server may either include data storage, such as hard drives and optical disk drives as an integral part of the network server (e.g., within the same cabinet or enclosure and/or using the same power supply), as connected peripherals, or may access data storage, such as hard drives and optical disk drives, over a network, or a combination of these. Data storage comprising hard drives may often include a rotating magnetic medium configured for the storage and retrieval of data, computer programs or other information. In some embodiments, data storage may be a solid-state drive using semiconductor memories. In other embodiments, some other type of computer useable medium may be used. Data storage need not necessarily be contained within the network server. For example, in some embodiments the data storage may be server storage space within a network that is accessible to the network server for the storage and retrieval of data, computer programs or other information. In some instances, the network server may use storage space at a server storage farm, or like type of storage facility, that is accessible by the Internet or other communications network or medium. Accessible data storage may be used to store the software, instructions and programs executed by the network server or the BIMS, including for example, all or parts of the computer application program for carrying out activities of the various embodiments.

In some embodiments, there is provided a network server, comprising various components suitable for implementing the various embodiments disclosed herein. The network server may be configured in the form of a desktop computer, a laptop computer, a mainframe computer, or any other hardware or logic arrangement capable of being programmed or configured to carry out instructions. In some embodiments, the network server may act as a server, accepting inputs from a remote user over a local area network (LAN), the Internet, or an intranet. In other embodiments, the network server may function as a smart user interface device for a server on the LAN or over the Internet. The network server may be located and interconnected in one location, or may be distributed in various locations and interconnected via communication links such as a LAN or a wide area network (WAN), via the Internet, via the public switched telephone network (PSTN), a switching network, a cellular telephone network, a wireless link, or other such communication links. Other devices may also be suitable for implementing or practicing the embodiments, or a portion of the embodiments. Such devices include personal digital assistants (PDA), wireless handsets (e.g., a cellular telephone or pager), and other such electronic devices preferably capable of being programmed to carry out instructions or routines. Those of ordinary skill in the art may recognize that many different architectures may be suitable for the network server. In some embodiments, the network server may include a processor which may be embodied as a microprocessor, two or more parallel processors, a central processing unit (CPU) or other such control logic or circuitry. The processor may be configured to access a local cache memory, and send requests for data that are not found in the local cache memory across a cache bus to a second level cache memory. Some embodiments may integrate the processor, and the local cache onto a single integrated circuit and other embodiments may utilize a single level cache memory or no cache memory at all. Other embodiments may integrate multiple processors onto a single die and/or into a single package. Yet other embodiments may integrate multiple processors with multiple local cache memories with a second level cache memory into a single package with a front side bus to communicate to a memory/bus controller. The memory/bus controller may accept accesses from the processor(s) and direct them to either the internal memory or to the various input/output (I/O) busses. Some embodiments of the network server may include multiple processor packages sharing the front-side bus to the memory/bus controller. Other embodiments may have multiple processor packages with independent front-side bus connections to the memory/bus controller. The memory bus controller may communicate with the internal memory using a memory bus.

In embodiments disclosed herein, disclosed systems provide for instantiation of service function objects distinctly from data repositories that run the service objects associated with an IT system, or that store data tables (or other structures) containing data describing a state or attributes of the service objects. The BIMS and IPR can generally more effectively model the status and operability of the service functions through instantiating objects relating thereto on the network server (or data storage accessible thereby). This provides for greater flexibility of dynamically instantiating new service function objects, or dynamically amending existing service functions or relationships therebetween. In embodiments, the service function objects are instantiated on the network server or on computing devices that are communicatively connected over a network.

In some embodiments, each service object has access to all direct service function links for service function objects directly linked directly thereto, and all indirect service function links for service function objects linked indirectly are determined by the network server dynamically. In some cases, all existing paths between indirectly linked service function objects may be stored; in other cases, including when the number of linkage paths could be complex, linkages from any given service function object, or portions thereof, may be determined dynamically, or on demand. In embodiments, a service function may comprise any of the following: a given network device or component; a given computing device or component thereof; a given function performed by the given network device, the given computing device, or by a combination thereof; or a combination thereof. A service function may comprise an aspect of the networking layers as represented in the OSI model; for example, any aspect of the physical, data link, network, transport, session, presentation, application layers could constitute a service function. The OS, data storage, a virtual component (e.g. a virtual machine), a jail, a container, or any constituent computing aspect from which such components are operated or instantiated may comprise a service function; alternatively, as service or function that is provided by such aspects may be considered as a service function, for which a service function object as a representation thereof may be instantiated by the BIMS.

In some embodiments, a BIMS may be implemented in association with other types of systems. Any type of system comprising any related service functions that provide related and/or dependent systems, and is not limited to IT management systems. The service function objects can be used to model any business, operational, or physical service functions that utilize dependent or related system components. For example, business functions, such as sales and marketing functions, HR functions (including payroll, hiring, role determination and assignment), shipping and distribution functions, customer service functions, and IT management systems. Each function may have one or more service function objects associated therewith. Upon the creation or development of a new service function, the system may implement a new class and class relationship rules and models, that are coded directly into the intelligent object model. Accordingly, as new service functions are implemented (or introduced for management by a BIMS), new objects in respect of existing types of service functions or new classes for new types of service functions (or new or different types of relationships). Accordingly, whereas an IT management system has been provided as exemplary embodiments, the same system may be used to model, infer relationship impact, and determine critical and alternative relationship paths in any business, operational, or physical system. A set of non-limiting examples, intelligent objects, with relationship information comprising a part thereof, wherein critical paths can be determined and impact assessments for directly and indirectly linked service functions, may include the following:

Transportation (Objects can be Planes, Trains, Automobiles (self-driving included), Airplanes, Spacecraft, Watercraft, Boats, Ships, Motorcycles etc.)

Planes or other complex systems (Objects can be instantiated from classes relating to, and relationships between, navigational system, motion control, landing gear, life support systems, entertainment and announcement systems, fire suppression and fire detection, food resources and preparation, flight scheduling)

Building Systems (Objects can be instantiated from classes relating to, and relationships between, Heating/Cooling, Structure, Alarm Systems, Monitoring, Water, Air Quality etc.)

Medical Science (Objects can be instantiated from classes relating to, and relationships between, Organs, Systems in the body cardio, vascular, muscle, nervous systems)

Environmental Health and Population Analysis (Relationship between the environment and human health, e.g. pesticide use and cancers, water and air pollution and disease etc.)

Technology (Traditional Data Center Objects/Cloud Computing Components in the data center Servers, Mainframes, Networks, Storage, their relationships and impact.

Telecommunication Systems (Objects can be instantiated from classes relating to, and relationships between, network devices, routers, switches, interfaces, TCAMS, etc.)

Financial and Banking Systems (Objects can be instantiated from classes relating to, and relationships between, customers, accounts, transfers, securities, loans, financial instruments, branches, ATMs, cash, etc.)

All of the non-limiting examples of systems noted above include components and aspects that are inter-related. Each of them can be modelled using an intelligent object model as disclosed herein, including the relationships between each of the constituent service functions (as modeled by objects within a BIMS). Accordingly, an impact assessment and critical path analysis, to determine impact between indirectly linked service functions, even when such indirect link is difficult to determine in advance, can be performed for non-IT systems.

Exemplary Functions and Systems

The Business Intelligence Management Systems (BIMS) in some embodiments hereof improve the way data is holistically gathered and structured using the Intelligent Object Model (IOM), and significantly improves the data analytics, data mining and reporting capability via Intelligent Path Routing (IPR). This facilitates information collection, arrangement, and analysis and to utilize their information to make operational and strategic and tactical decisions to improve efficiencies and ultimately customer satisfaction to gain competitive advantage. Methods and systems disclosed herein may be utilized in the following technical areas:

| Common business and technical areas supported by the Business Intelligence Management System (BIMS) | | | |
|---|---|---|---|
| Access Management | Contract Management | Problem Management | Security Management |
| Accounting and Financial Management | Customer Relationship Management | Product and Service Development | Service Catalog Management |
| Application Management | Disaster Recovery Management | Program Management | Service Level Management |
| Asset Management | Demand Management | Project Management | Service Management |
| Availability Management | Facility Management | Release Management | Service Portfolio Management |
| Capacity Management | Incident Management | Reporting Capability | Supplier Management |
| Configuration Management | Knowledge Management | Request Management | Strategy Management |
| Continuity Management | Materials Management | Research and Development | Supply Chain Management |
| Continuous Service Improvement | Monitoring and Event Management | Sales and Marketing | Vendor Management |

FIG. 1 is an exemplary illustration of the relationships between an IT system architecture 140, the Business Impact Management System (BIMS) 120, the layered groupings of the intelligent path object model 130A through 130J and the Holistic Business Management Capability, Analytics and Reporting Model 110. The Business Intelligence Management System 120 is designed to efficiently structure relevant business data together into objects, attributes and object relationship into a cohesive object model. The Business Intelligence Management System 120 address shortcomings in the state of the art through the use of an Intelligent Object Model (IOM) 130 that is flexible, and capable of bringing together relevant data from various trusted sources into a cohesive format and addressing the disparate data schema problem. The Holistic Business Management Capability 110 provides data analytics, impact assessments and reporting capabilities related to the linkages of the Intelligent Object Models 130 via the Business Intelligence Management System 120. This overall IP system architecture 140 combined with the Holistic Business Management Capability 110 creates an effective Enterprise Decision Making Model 100.

Figure 2:
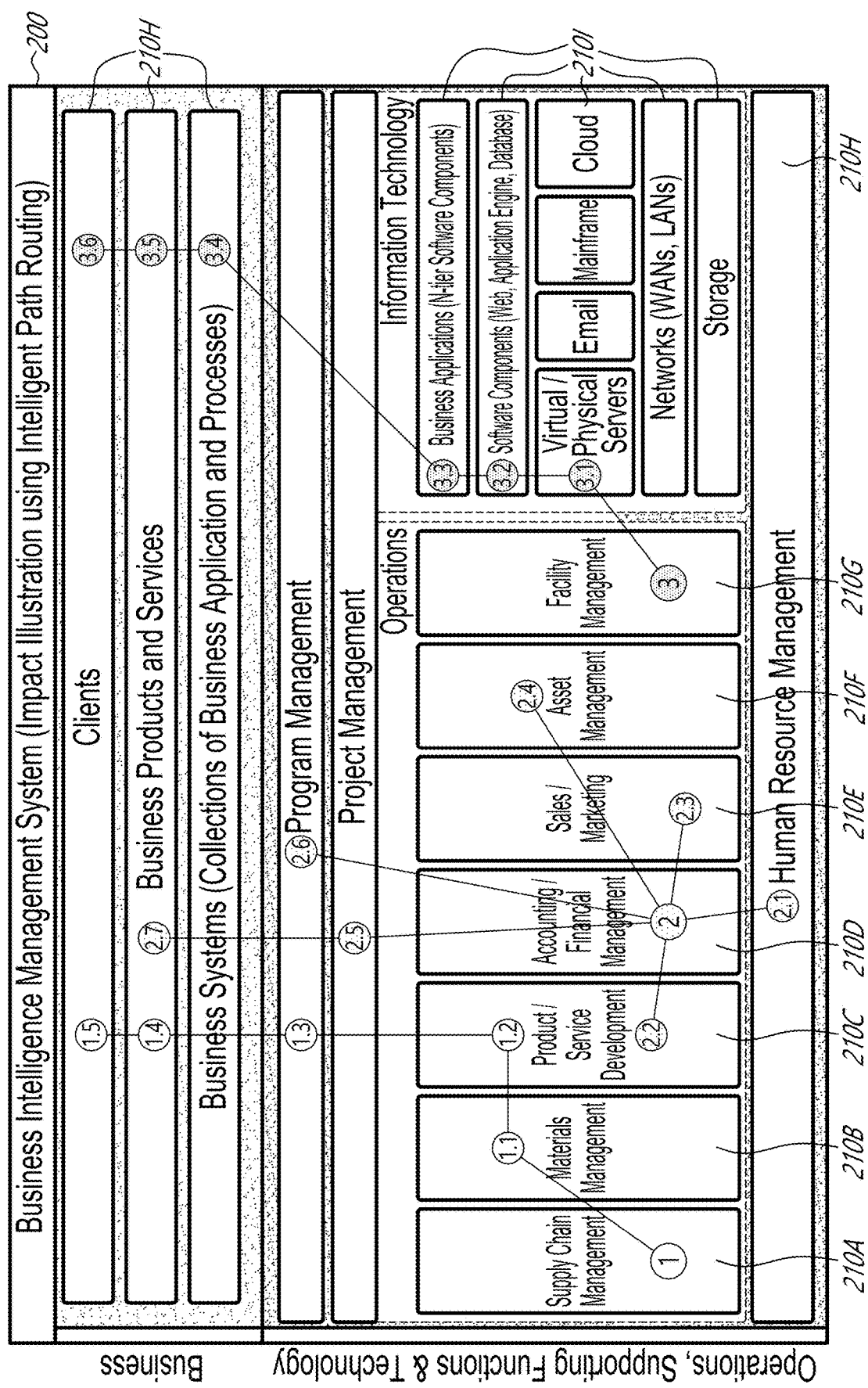
FIG. 2 is an exemplary intelligent path routing using 3 impact assessments.

With reference to FIG. 2, and in accordance with one exemplary embodiment, a business intelligence management system, generally referred to using the numeral 200, will now be described. There is shown 3 impact assessments as examples and their respective paths across objects in the representative IT system shown. The Business Impact Management System (BIMS) 200 contains the Intelligent Path Routing of the Service Function Objects 210A through 210J, which are virtual representations of the Intelligent Object Model (IOM) 130A through 130J as shown in FIG. 1. FIG. 2 shows an exemplary Intelligent Path Routing using 3 impact assessments which provides for the determination of impact assessments across directly related objects or extend the capability to allow impact to be determined across objects that are indirectly related or inferred.

With reference to FIG. 3, and in accordance with one exemplary embodiment, there is shown an exemplary IT system and the associated architecture of an associated Business Intelligence Management System (BIMS). Business Intelligence Management System (BIMS) Architecture of FIG. 3 shows how the integration into a heterogeneous environment that can collate the data from the trusted sources into a cohesive object model. The intention is to feed only relevant data and not replace the trusted sources as they may have other features that are fit for purpose. i.e. Human Resource Management System will have many features built in so only relevant objects, (scope to be determined in the implementation) deemed to be important for impact assessment or to increase the data analytics and reporting capability.

With reference to FIG. 4, and in accordance with one exemplary embodiment, there is shown three exemplary impact assessments in association with their impact assessment routing paths. Impact path routing schemes 1, 2 and 3 are respectively shown in association with various systems and objects that have been mapped to an exemplary business process. The three examples show impact assessments, wherein these paths can be added to the system using the Intelligent Path Routing (IPR) so that the systems know the path of the impacts in order to determine impact assessment. Weighted values can also be added as part of the automation and intelligence so the severity and priority of impact can be measured and reported upon, and appropriate notifications sent out automatically.

Impact assessments can be assessed as follows in the following supply chain management example. An example when there is a disruption in the supply of raw materials such as aluminum used to make cellular phones, this could have an impact on the following:

1.1 Materials Management—find another supplier with the same cost, same quality of aluminum if possible, may have to use lessor grade aluminum
1.2 Product/Service Development—may now have to use less quality aluminum in the production of the cellular phones,
1.3 Program Management—manage the new vendors, internal programs and processes to produce the cellular phones,
1.4 Business Services Products and Services—may not be able to produce the same number or same quality of cellular phones,
1.5 Clients—may purchase a lessor quality cellular phone.

Figure 5:
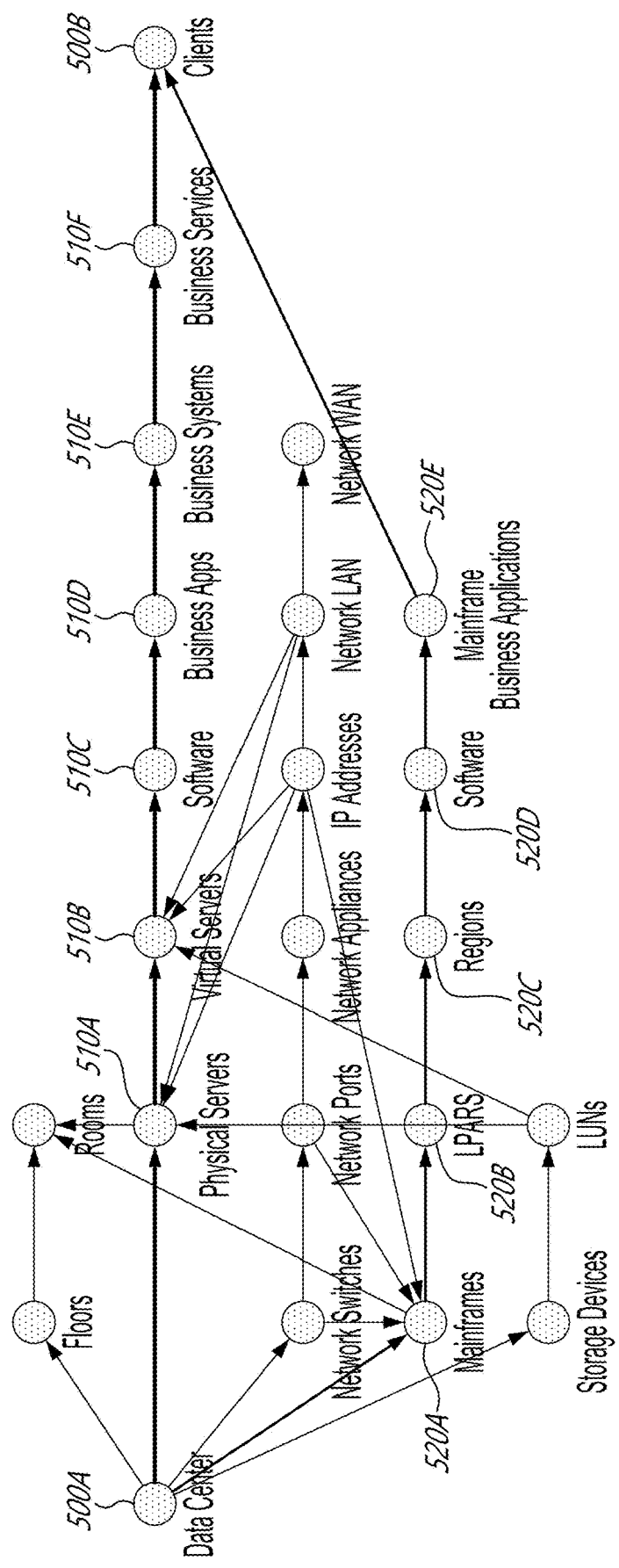
FIG. 5 is an exemplary diagram of linkages and impact pathways between independent components of an IT system as shown in FIG. 3 with critical and alternative paths indicated in accordance with one embodiment.
Figure 7:
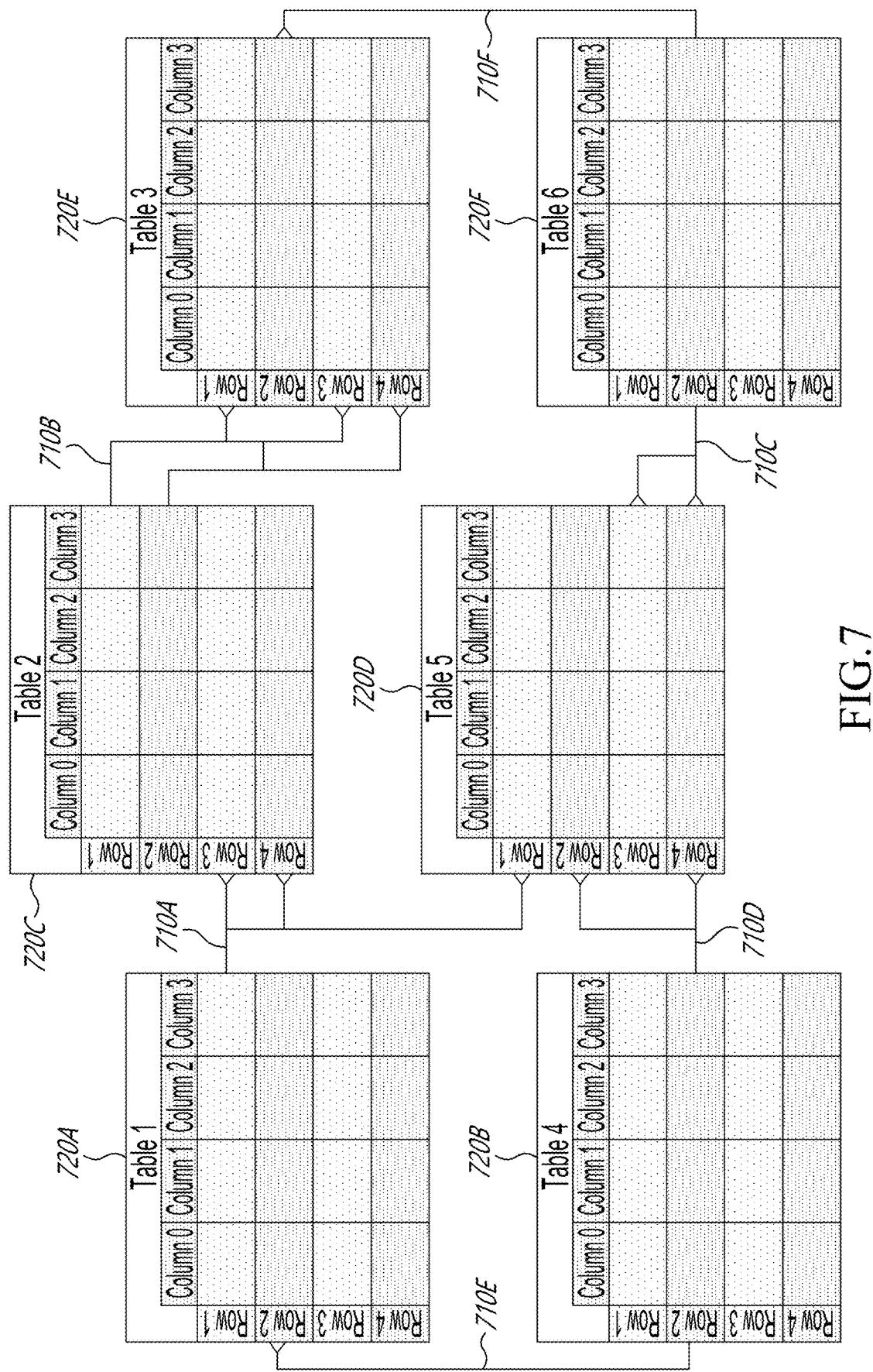
FIG. 7 shows an example of a relational database structure for tracking service functions in an IT system and relationships therebetween in current systems.

Impact assessments can be assessed in accordance with one embodiment in the following Accounting/Financial Management example when a budget is reduced from 10 million to 5 million; this could have an impact on the following:

2.1 Human Resource Management—there may be layoffs, reduced pay, reduced benefits, reduced training for staff and consultants,
2.2 Product Service and Development—less funds for research and development, fewer products made for inventory
2.3 Sales/Marketing—sales staff may be reduced, less product to sell
2.4 Asset Management—less funds to purchase new assets, may have to extend the asset lifecycle, make do with the asset at hand
2.5 Project Management—less funds for projects, may have to reduce project scope, cancel projects, reduce activities, reduce project staff and consultants
2.6 Program Management—reduce or cancel programs that are not core to the business
2.7 Business Products/Services—less funds for products and services, reduction in the variety of products and services or cancellation of select products and or services Impact assessments can be assessed in accordance with one embodiment in the following Facility Management example. —There is a power outage at a data center contained in a facility and the backup power failed. Impact assessment to determine the IT information technology infrastructure affected, the applications, the business services and the clients impacted, as follows:

3.1 Virtual/Physical Servers—powered down due to the power outage
3.2 Software Components (Websites, Applications, Databases)—that are offline due to the servers powering down
3.3 Business Applications—affected business applications that are no longer accessible or able to support business services
3.4 Business Systems—any business systems that were made up of business applications that are no offline
3.5 Business Products or Services—all business products and services that are no longer available for consumption by any client
3.6 Clients—a list of impacted clients (and their contact information) experiencing business product and service interruption or no service at all With reference to FIG. 5, and in accordance with one exemplary embodiment, there is shown intelligent path routing in association with a predetermined (and predeterminable) path based upon a given problem and reflects an actual enterprise architecture. In this example, there is shown a power outage in a Data Center and the Business is interested to know what Servers are impacted, what Business Applications are down, the Business Services are not available and what Clients are not able to use the Services or Business Applications. Exemplary notation illustrating these relationships are as follows: A1. Facility (Data Center) <contains> Physical Servers <host> Virtual Servers <run> Software <enable> Business Applications <comprise> Business Systems <used by> Clients. the intelligent path is demonstrated in red from lines 3.0 to 3.6. Below is another example of the same intelligent path turned on its side. FIG. 5 shows an exemplary critical path from starting point 500A and ending point 500B via 510A-510F and also shows an alternative path from starting point 500A and ending point 500B via 520A-520E.

The intelligent path scenario of FIG. 5 could be used to assess the following query: What Clients are affected by Servers running Business Applications and Websites are impacted by the Data Center Power outage? FIG. 5 displays a small fraction of objects contained in a Facility (Data Center) however we are only interested in the Business Services and the Clients that are impacted by Server outage due to the power failure. This is an example of determining impact to a Client or group of clients through inference. The Data Center is related to the Clients through a series of objects over a number of hops. Traditional databases will give you a report that would include all of the paths through recursive queries and it would give exponential results that less meaningful and timely and have no intelligence build in.

Intelligent Path Routing (IPR) can be programmed into the BIMS so that, in some embodiments, a user may select the impact entry point i.e. Data Center and the exit point, Client. The pre-determined intelligent path will automatically be followed to down or up the path through the inferred relationships resulting in the real impact and answer the given question.

In accordance with a second exemplary embodiment, there is shown a second intelligent path routing in association with a predetermined (and predeterminable) path based upon a given problem and reflects an actual enterprise architecture. In this example, the following assessment is considered: What Clients are impacted from the same Data Center power outage are affected by Mainframe Applications? Exemplary notation illustrating these relationships are as follows: Data Center <contains> Mainframes <hosts> LPARs <contain> Regions <run> Software <enable> Mainframe Business Applications <used by> Clients. An intelligent path as a second example whereby the business needs to know if any Mainframes were impacted by the power outage, the Software and any Business Applications that are used by any specific Clients. This information is used to manage Client relations and expectations. It is also used to take continuity measures such as to evoke Disaster Recovery processes to either fail over to a redundant Mainframe located in a separate Data Center that is on standby.

There is provided in one embodiment, a server-based IT management system comprising a network server further comprising a service function object store that stores a plurality of service function objects, each service function object being a digital representation of a service function and comprising one or more service attributes and one or more service function links for linking each service function object to at least one other service function object; and a network communications interface for receiving information indicative of an operating state for each service function; wherein each service function link is associated with a service-loss impact value indicating service-loss impact on the operating state of each linked service function linked thereto upon a reduction in operating state of the service function; and wherein the operability of any given service function is determined automatically upon the reduction of operating state of any one or more other service functions based on direct and indirect linkages between the given service function and the other service functions and the respective service-loss impact values associated with each said direct and indirect linkages.

Optionally, embodiments of the server-based IT management system may be configured such that each service function object can be generated dynamically. Optionally, embodiments of the server-based IT management system may be further configured such that the one or more service attributes for each service function object can be generated dynamically.

Optionally, embodiments of the server-based IT management system may be configured such that the service-loss impact value is function of at least one of: the service attribute of a directly linked service function object and the service attribute of an indirectly linked service function object.

In embodiments, there may be provided methods and systems for determining the existence, nature, and attributes of linkages or relationships between any two or more service objects within an IT system, including the operational impact on any service function given the loss or reduction of operability of any other service function that is linked or shares a relationship or dependency. In some embodiments, a critical path between two or more critical service functions is determined, said critical path comprising of linkages between the service functions and other related service functions. In some cases, an impact, sometimes referred to as a critical impact, on operability of a first set of at least one service functions on said critical path is assessed based on a potential reduction of operating state of at least one impacted service function having a linkage with said critical path. Such an assessment may be calculated based on the service function links and respective service-loss impact values associated with each of the service function objects that correspond to the service functions on said critical path. In such cases, a critical path can be determined between any two service functions and by using the service-loss impact values a better understanding of the effect of a loss or reduction in operability can be understood. In some embodiments, the impact on operability of the first set of at least one service function is further determined based on a reduction of operating state of one or more less critical service functions. By doing so, upon the reduction of operability of a given service function that impacts a critical service function, other non-critical (or less critical) service functions can be removed or stopped on the critical path so as to mitigate the effect on critical service functions. For example, a minimized impact on operability of the first set of at least one service function is implemented by reducing the operating state of the one or more less critical service function upon the occurrence of an actual reduction of operating state of the at least one other service function on said critical path.

In some embodiments, at least one alternative path between the two or more critical service functions can be determined, either in advance or in real-time. Said alternative path may comprise of linkages between the critical service functions that does not include an impacted service function (i.e. a service function with reduced operability), wherein an alternative impact on operability of said first set of at least one service functions on said alternative path is assessed based on the potential reduction of operating state of the at least one other service function. Provided that the alternative critical path, in which at least the impacted service function object is replaced with another service object having at least improved operational capabilities relative to the impacted service function, the IT management systems replaces said critical path with said alternative path. In some embodiments, where there is no alternative path between the two or more critical service functions that does not comprise said impacted service function, an alternative service function may be identified along said alternative path to provide redundancy for said impacted critical service function and thus ensure that the critical path is not the only linkage or set of relationships between an affected or potentially affected first service function and a critical service function (whose operation may not or should not be impacted negatively).

Figure 10:
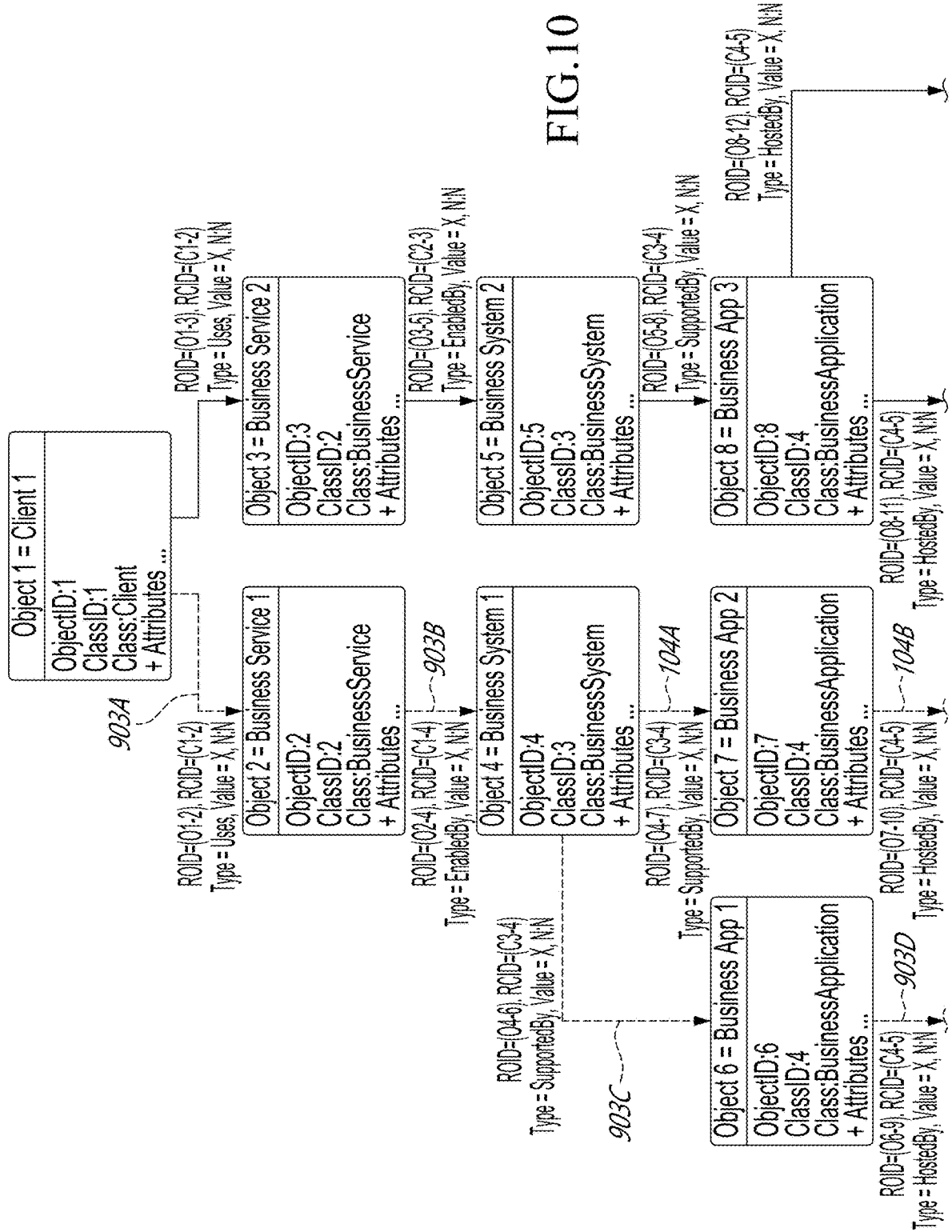
FIG. 10 shows an exemplary conceptual diagram of the service functions objects associated with a typical IT system, arranged in accordance with an intelligent object model in accordance with one embodiment hereof, wherein critical paths for a given service function object is determined.
Figure 10:
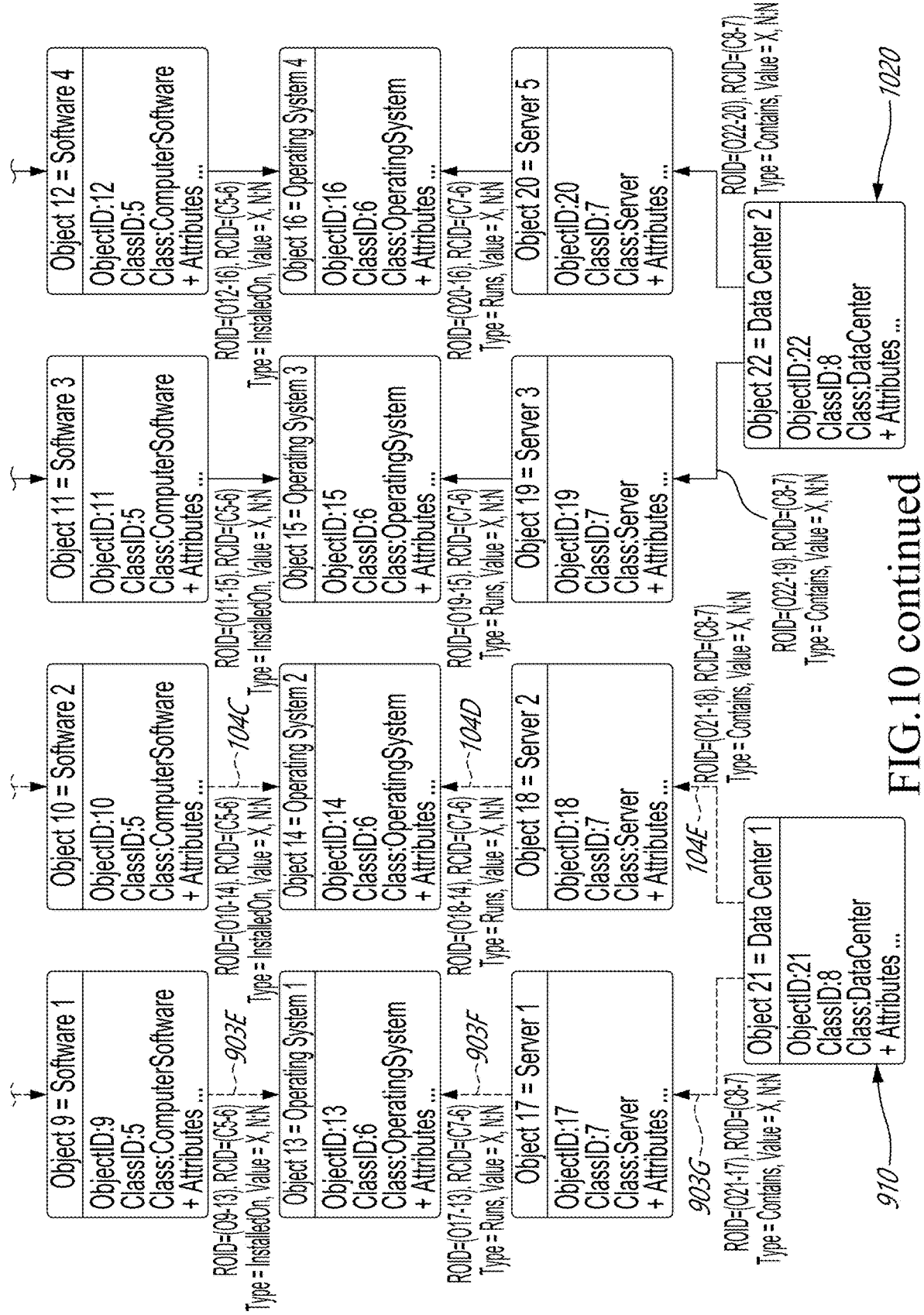

With reference to the exemplary intelligent object model shown in FIG. 10, which illustrates a potential reduction in operation of the data center 1 service function object and the critical paths associated therewith. Having a predefined set of Classifications and relationships (which are represented by service function links in embodiments of the IOM) reflecting the real world deployed Enterprise Architecture now enables Intelligent Path Routing through the Relationship Classification Identification (RCID). Correspondingly the Relationship Object Identification (ROID) value can dynamically determine the actual instances of the Objects in the impact path. To use the RCID value to determine all instances of the impact. Start with the failed Object (Data Center 1) Data Center 1 910 uses the Class of Data Center. The Relationship Classification ID RCID dictates path from the Starting Point Data Center 1 to the Client via the following RCID path. This becomes the rule to automatically determine the actual instances of the objects impacted. As further shown in the table 1110 in FIG. 11, Data Center Classification Intelligent Path to Client=RCID=(C8−7)+ RCID=(C7−6)+RCID=(C5−6)+RCID=(C4−5)+RCID= (C3−4)+RCID=(C1−4)+RCID=(C1−2). Cross referencing the RCID with the ROID will give you the actual Object ID that can be reported upon. Therefore, Data Center 1 910 will impact Client 1 901 for accessing Business Service 1 1030 that depends upon Business System 1 1050 and Business Apps 1 and 2 1070A and 1070B. A similar method can be used to determine the impact of Data Center 2 1020 since we have defined the RCID, the cross-reference to the ROID will produce dynamically the actual objects impacted. Computational Impact can also be more accurately calculated using the attribute value pairs on the relationships combined with the object attributes.

While the present disclosure describes various embodiments for illustrative purposes, such description is not intended to be limited to such embodiments. On the contrary, the applicant's teachings described and illustrated herein encompass various alternatives, modifications, and equivalents, without departing from the embodiments, the general scope of which is defined in the appended claims. Except to the extent necessary or inherent in the processes themselves, no particular order to steps or stages of methods or processes described in this disclosure is intended or implied. In many cases the order of process steps may be varied without changing the purpose, effect, or import of the methods described.

Information as herein shown and described in detail is fully capable of attaining the above-described object of the present disclosure, the presently preferred embodiment of the present disclosure, and is, thus, representative of the subject matter which is broadly contemplated by the present disclosure. The scope of the present disclosure fully encompasses other embodiments which may become apparent to those skilled in the art, and is to be limited, accordingly, by nothing other than the appended claims, wherein any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims. Moreover, no requirement exists for a system or method to address each and every problem sought to be resolved by the present disclosure, for such to be encompassed by the present claims. Furthermore, no element, component, or method step in the present disclosure is intended to be dedicated to the public regardless of whether the element, component, or method step is explicitly recited in the claims. However, that various changes and modifications in form, material, work-piece, and fabrication material detail may be made, without departing from the spirit and scope of the present disclosure, as set forth in the appended claims, as may be apparent to those of ordinary skill in the art, are also encompassed by the disclosure.

What is claimed is:

1. A server-based IT management system for determining critical service functions for an operational system, the server-based IT management system comprising:
a network server comprising:
a hardware processor;
one or more memories storing a service function object store for storing digital data for instantiation as a plurality of service function objects by the processor, each service function object being a digital representation of a service function carried out by the operational system and comprising one or more service attributes and one or more service function links for linking each service function object to at least one other service function object of the operational system, the digital representation comprising an instantiation of said digital data by said processor, each service function comprising an IT component that is a device, function, service, or application, or a combination thereof, and which is controlled or monitored by the server-based IT management system via network communication; and
a network communications interface bus for receiving digital information over a network, said digital information comprising an indicator of a grade of functionality for each service function;
wherein each service function link is associated with a service-loss impact value providing an indicator of a level of service-loss impact on the functionality of each service function linked thereto upon a reduction in functionality of the service function as determined from the grade of functionality associated therewith; and
wherein the processor is configured to determine whether a given service function is a critical service function of the operational system by determining, for each of at least some of the service functions of the operational system, by determining if reduction of functionality of the given service function impacts functionality of the operational system based on direct and indirect linkages between the given service function and the any one or more other service functions and the respective service-loss impact values associated with each said direct and indirect linkages.

2. The server-based IT management system of claim 1, wherein each service function object is configured to be generated dynamically.

3. The server-based IT management system of claim 1, wherein the one or more service attributes for each service function object are configured to be generated dynamically.

4. The server-based IT management system of claim 1, wherein the service-loss impact value is function of at least one of: the service attribute of a directly linked service function object with an object corresponding to the given service function, and the service attribute of an indirectly linked service function object with an object corresponding to the given service function.

5. The server-based IT management system of claim 1, wherein the operational system is a transportation system.

6. The server-based IT management system of claim 5, where the transportation system comprises a plane, train, automobile, spacecraft, watercraft, or motorcycles.

7. The server-based IT management system of claim 5, wherein the transportation system is controlled autonomously.

8. The server-based IT management system of claim 1, wherein the operational system is a biological system.

9. The server-based IT management system of claim 1, wherein the operational system is an environmental system.

10. The server-based IT management system of claim 1, wherein the operational system is an information technology system.

11. The server-based IT management system of claim 10, wherein the information technology system comprises a server, a mainframe, a network, a storage device, a network device, a router, a network switches, a computing interface, and a TCAM.

12. A server-based IT management method for determining critical service functions for an operational system, said method implemented on a server-based IT management system comprising a network server, said network server further comprising one or more memories, a processor, and a network communications interface bus, said method comprising:

storing, in a service function object store in said one or more memories, digital data for instantiation as a plurality of service function objects by said processor, each service function object being a digital representation of a service function carried out by the operational system, each said service function comprising an IT component that is a device, function, service, or application, or a combination thereof that is controlled or monitored by the server-based IT management system via network communication, and each said service function object comprising one or more service attributes;

associating one or more service function links between two or more of the service function objects, wherein each service function link is associated with a service-loss impact value providing an indicator of a level of service-loss impact on the functionality of each service function linked thereto upon a reduction in functionality of the linked service functions as determined from a grade of functionality associated therewith;

receiving digital information over a network comprising an indicator of the grade of functionality for each service function via said network communications interface bus; and automatically determining for each of at least some service functions in the operational system, by the processor, whether a given service function is a critical service function of the operational system by determining if reduction of functionality of the given service function reduces the functionality of the operational system based on direct and indirect linkages between the given service function and the any one or more other service functions and the respective service-loss impact values associated with each said direct and indirect linkages.

13. The method of claim 12, wherein the service-loss impact value is function of at least one of: the service attribute of a directly linked service function object to said given service function and the service attribute of an indirectly linked service function object to said given service function.

14. The method of claim 12, wherein the operational system is a transportation system.

15. The method of claim 14, where the transportation system comprises a plane, train, automobile, spacecraft, watercraft, or motorcycles.

16. The method of claim 15 wherein the transportation system is controlled autonomously.

17. The method of claim 12, wherein the operational system is a biological system.

18. The method of claim 12, wherein the operational system is an environmental system.

19. The method of claim 12, wherein the operational system is an information technology system.

20. The method of claim 19, wherein the information technology system comprises a server, a mainframe, a network, a storage device, a network device, a router, a network switches, a computing interface, and a TCAM.

* * * * *